United States Patent
Grogg

(10) Patent No.: US 8,584,786 B2
(45) Date of Patent: Nov. 19, 2013

(54) IDLE-ABLE POWER TRANSFER UNIT

(75) Inventor: John Allen Grogg, LaOtto, IN (US)

(73) Assignee: Eaton Corporation, Cleveland, OH (US)

( * ) Notice: Subject to any disclaimer, the term of this patent is extended or adjusted under 35 U.S.C. 154(b) by 1123 days.

(21) Appl. No.: 12/051,180

(22) Filed: Mar. 19, 2008

(65) Prior Publication Data

US 2008/0230295 A1    Sep. 25, 2008

Related U.S. Application Data

(60) Provisional application No. 60/918,795, filed on Mar. 20, 2007.

(51) Int. Cl.
*B60K 17/344* (2006.01)
*G06F 17/00* (2006.01)

(52) U.S. Cl.
USPC ............................................. 180/248; 701/89

(58) Field of Classification Search
USPC .................................. 180/247, 248, 249, 250
See application file for complete search history.

(56) References Cited

U.S. PATENT DOCUMENTS

| | | |
|---|---|---|
| 4,770,266 A | 9/1988 | Yamaguchi et al. |
| 4,875,698 A | 10/1989 | Uchiyama |
| 5,083,635 A | 1/1992 | Tashiro |
| 5,105,901 A | 4/1992 | Watanabe et al. |
| 5,125,876 A | 6/1992 | Hirota |
| 5,407,024 A | 4/1995 | Watson et al. |
| 5,890,989 A | 4/1999 | Yamazaki et al. |
| 5,984,039 A | 11/1999 | Mayr |
| 6,015,361 A | 1/2000 | Yamazaki et al. |
| 6,027,422 A | 2/2000 | Yamazaki |
| 6,490,945 B2 * | 12/2002 | Bowen ............................ 74/339 |
| 6,817,434 B1 | 11/2004 | Sweet |
| 6,830,122 B2 * | 12/2004 | Kroppe .......................... 180/197 |
| 6,832,972 B2 * | 12/2004 | Ishikawa ........................ 475/223 |
| 6,935,475 B2 | 8/2005 | Weilant |
| 7,278,946 B2 * | 10/2007 | Williams et al. ............... 475/198 |
| 2002/0155916 A1 | 10/2002 | Brown et al. |
| 2005/0247536 A1 | 11/2005 | Roe et al. |
| 2006/0128515 A1 | 6/2006 | Mueller et al. |
| 2006/0247082 A1 | 11/2006 | Mueller et al. |
| 2006/0281597 A1 | 12/2006 | Williams et al. |

FOREIGN PATENT DOCUMENTS

| | | |
|---|---|---|
| GB | 2407804 | 1/2004 |
| JP | 2002370557 | 12/2002 |

OTHER PUBLICATIONS

Technical Paper on "Development of Free Running Differential" (May 1997) (4 pages).
International Searching Authority, International Search Report in PCT/US2008/057447, mailed Aug. 4, 2008.
International Searching Authority, Written Opinion in PCT/US2008/057447, mailed Aug. 4, 2008.

* cited by examiner

*Primary Examiner* — Tony Winner
*Assistant Examiner* — Jacob Knutson
(74) *Attorney, Agent, or Firm* — Dykema Gossett PLLC

(57) ABSTRACT

A vehicle driveline comprising a primary drive system including at least one primary drive wheel and an auxiliary drive system including at least one auxiliary drive wheel is disclosed. The vehicle driveline may further comprise a system for idling the auxiliary drive system. The system may include at least one wheel disconnect device for selectively connecting and disconnecting the auxiliary drive wheel from the auxiliary drive system and a power transfer unit for selectively engaging and disengaging the auxiliary drive system from the primary drive system. The power transfer unit may include a multi-plate clutch in series with a dog clutch.

22 Claims, 3 Drawing Sheets

IDLE-ABLE POWER TRANSFER UNIT

RELATED APPLICATION

This application claims the benefit of U.S. Provisional Patent Application No. 60/918,795 filed Mar. 19, 2007, hereby incorporated by reference in its entirety.

TECHNICAL FIELD

The present invention relates to an idle-able power transfer unit, including a vehicle driveline system comprising an idle-able power transfer unit. In an embodiment, the vehicle driveline system may comprise an all wheel drive (AWD) vehicle driveline system.

BACKGROUND

A conventional AWD driveline for a motor vehicle may include a primary front drive axle coupled to a secondary or auxiliary rear drive axle. When the driveline is operating in a 4×2 mode of operation (i.e., four wheels, with two of them operating as driving wheels), the primary front drive axle must provide tractive forces not only to keep the motor vehicle moving, but also to overcome the frictional losses of the secondary or auxiliary rear drive axle that is being driven through the tire/road surface interface. Driveline losses may be due to oil churning losses, viscous drag, inertia, as well as friction.

In an effort to minimize loss and provide a more fuel efficient driveline when in a 4×2 mode of operation, it may be desirable to have the ability to completely idle the secondary or auxiliary drive system, including the secondary or auxiliary rear drive axle.

SUMMARY

A vehicle driveline comprising a primary drive system including at least one primary drive wheel and an auxiliary drive system including at least one auxiliary drive wheel is disclosed. The vehicle driveline may further comprise a system for idling the auxiliary drive system. The system may include at least one wheel disconnect device for selectively connecting and disconnecting the auxiliary drive wheel from the auxiliary drive system and a power transfer unit for selectively engaging and disengaging the auxiliary drive system from the primary drive system. The power transfer unit may include a multi-plate clutch in series with a dog clutch.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
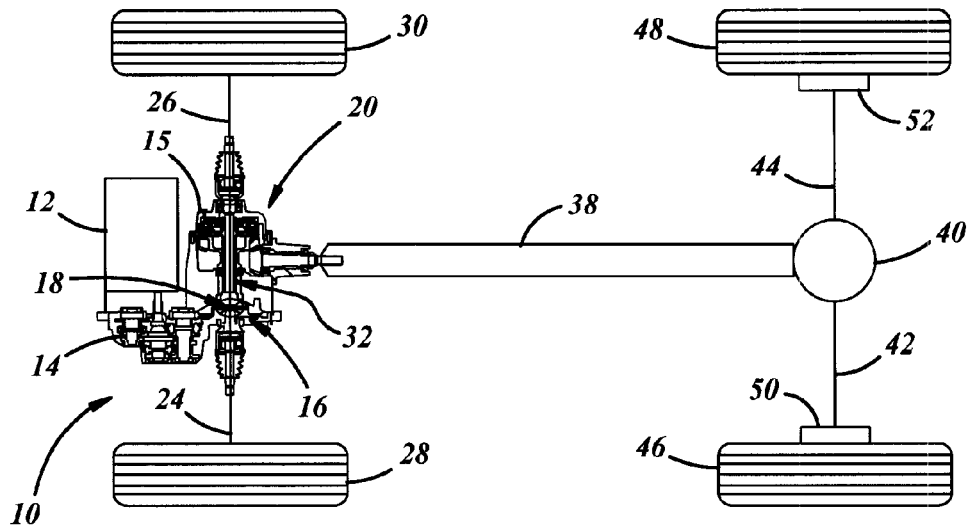
FIG. 1 illustrates an AWD vehicle driveline system according to an embodiment of the present invention.

Referring to FIG. 1, an AWD vehicle driveline system 10 according to an embodiment of the invention is generally shown. AWD system 10 may comprise a primary drive system and a secondary or auxiliary drive system. The primary drive system may comprise a primary front drive axle and one or more primary drive wheels 28, 30. The secondary or auxiliary drive system may comprise a secondary or auxiliary rear drive axle and one or more secondary or auxiliary drive wheels 46, 48. In an embodiment as illustrated, the primary drive system may include two primary drive wheels, and the secondary or auxiliary drive system may include two auxiliary drive wheels.

When AWD system 10 is operating in a 4×4 mode of operation (i.e., all four wheels transmit power to the road), torque may be transferred from an engine 12, through a transmission 14 (e.g., part of transaxle 15), and into a front driving differential case 16. The torque may be further split to a front driving differential 18 and a power transfer unit 20 (e.g., idle-able power transfer unit). The torque that is split through the front driving differential 18 (e.g., through the front driving differential gear set) may then be further distributed via front half shafts 24, 26 to a pair of primary (e.g., front) drive wheels 28, 30 of the motor vehicle.

Figure 2:
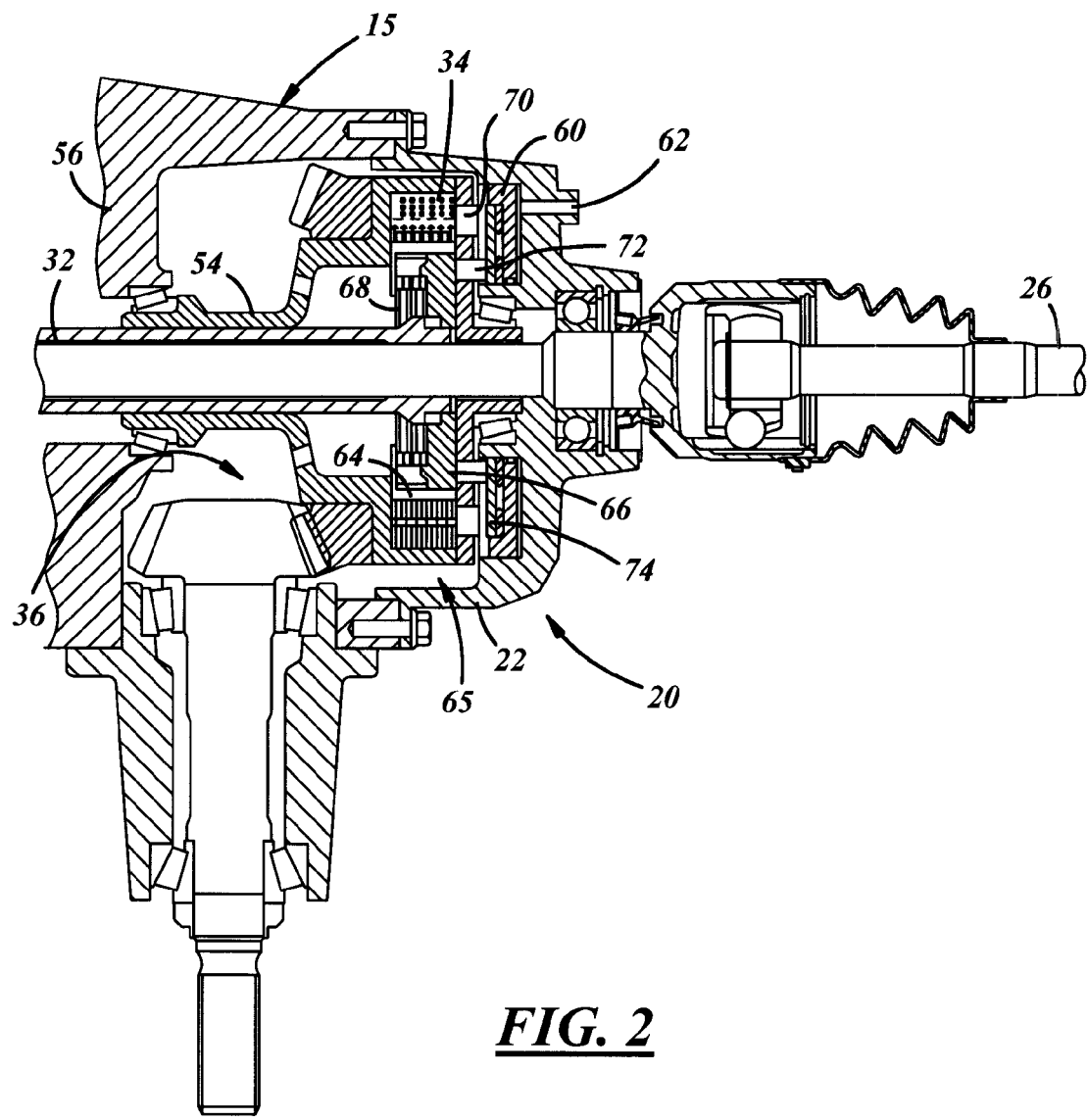
FIG. 2 is a cross-sectional view of an idle-able power transfer unit according to an embodiment of the present invention.

Referring now to FIGS. 1 and 2, the torque distributed to power transfer unit 20 may be provided via a hollow shaft 32 that may directly connect the front driving differential case 16 and a hydraulically-actuated multi-plate clutch 34 whose engagement may limit the torque transferred through a right angle gear set 36. Clutch 34 may be disconnectable and may have a stiffness sufficient to limit the torque transferred through the right angle gear set 36. The torque transferred through the right angle gear set 36 may drive a drive shaft 38 that in turn drives a rear drive axle 40. Rear drive axle 40 may then distribute torque through left and right rear half shafts 42, 44 into a pair of auxiliary (e.g., rear) drive wheels 46, 48 of the motor vehicle. Torque flow to the auxiliary drive wheels 46, 48 may be selectively interrupted by wheel hub disconnects 50, 52 as will be described in more detail below.

The secondary (i.e., auxiliary) drive system may include power transfer unit 20. Power transfer unit 20 may include a housing 22. Housing 22 may be bolted to a housing of transaxle 15. The secondary drive system may further include the drive shaft 38, an idle-able clutch member 65 (e.g., combination of moveable collar 66, coupling member 64, clutch housing 54, and multi-plate clutch 34) for all wheel drive, the rear axle 40, and a rear shaft assembly including the rear half shafts 42, 44.

As described above, torque may be transferred from engine 12, through transmission 14 (e.g., part of transaxle 15), and into a front driving differential case 16 where torque may be further split to a front driving differential 18 and a power transfer unit 20 (e.g., idle-able power transfer unit). Referring now to FIG. 2, power transfer unit 20 may have a housing 22 that is bolted to transaxle 15. Referring still to FIG. 2, power transfer unit 20 may include a clutch housing 54 supported for rotation by a transaxle housing 56 and housing 22. An axial moveable piston 60 may be disposed within a cavity between the clutch housing 54 and housing 22. The piston cavity may communicate with a source of hydraulic fluid pressure 62, which may variably provide fluid pressure to the piston cavity to axially move piston 60. It will be appreciated that the source of hydraulic pressure 62 is not limited to any particular hydraulic fluid pressure generating device, and may include, without limitation, a pump, valves, accumulator, and/or electronic control unit (ECU), or any combination thereof.

Clutch 34 may be in series with a dog clutch as described herein. A clutch 34 in series with a dog clutch may be configured to completely disconnect the auxiliary drive system from the primary drive system and completely idle the auxiliary drive system. Clutch 34 may include a plurality of outer disks, which may be in splined engagement with a set of internal splines defined by the clutch housing 54. In addition, the clutch 34 may include a plurality of inner disks, which may be interleaved with the outer disks in a manner well-known to those of ordinary skill in the art. The inner disks may be in splined engagement with a coupling member 64. The coupling member 64 may define a set of internal splines, which are in splined engagement with an axially moveable collar 66 having on its radially inner face one or more dog clutch features, the shape and function of which are well known in the art. Accordingly, the dog clutch may include this axially moveable collar 66. The dog clutch features of the axially moveable collar 66 may be selectively engageable with corresponding dog clutch features on the hollow shaft 32, such that the coupling member 64 may be selectively fixed to rotate with the hollow shaft 32 when the dog clutch features of the axially moveable collar 66 and the hollow shaft 32 are engaged. A resilient biasing member 68, such as a compression spring, may apply a force against collar 66 in a direction away from engagement of the dog clutch features.

Extending through the clutch housing 54 may be first and second axially moveable pins 70, 72. The first and second axially moveable pins 70, 72 may be engageable on one end with the clutch pack 34 and collar 66, respectively, and on the other end with an annular plate-like member 74. At least one thrust bearing may be located between piston 60 and pins 70, 72. The thrust bearing may comprise a cage, a plurality of rollers (e.g., needles), and annular member 74. Annular member 74 may be configured to rotate relative to piston 60 because of its separation from piston 60 by one or more thrust bearings. The first axially movable pin 70 may be shorter in length than the second pin 72. As piston 60 moves axially in the piston cavity due to an increase in fluid pressure therein, annular member 74 may also be forced to move axially, which in turn may force second pin 72 to push the collar 66 into locking engagement with the hollow shaft 32. Upon further movement of piston 60, the annular member 74 may engage the first pin 70 to compress the clutch pack 34 and allow the transfer of torque between the hollow shaft 32 and the clutch housing 54, the level of torque being variable and dictated by the force applied to the clutch pack 34.

Figure 3:
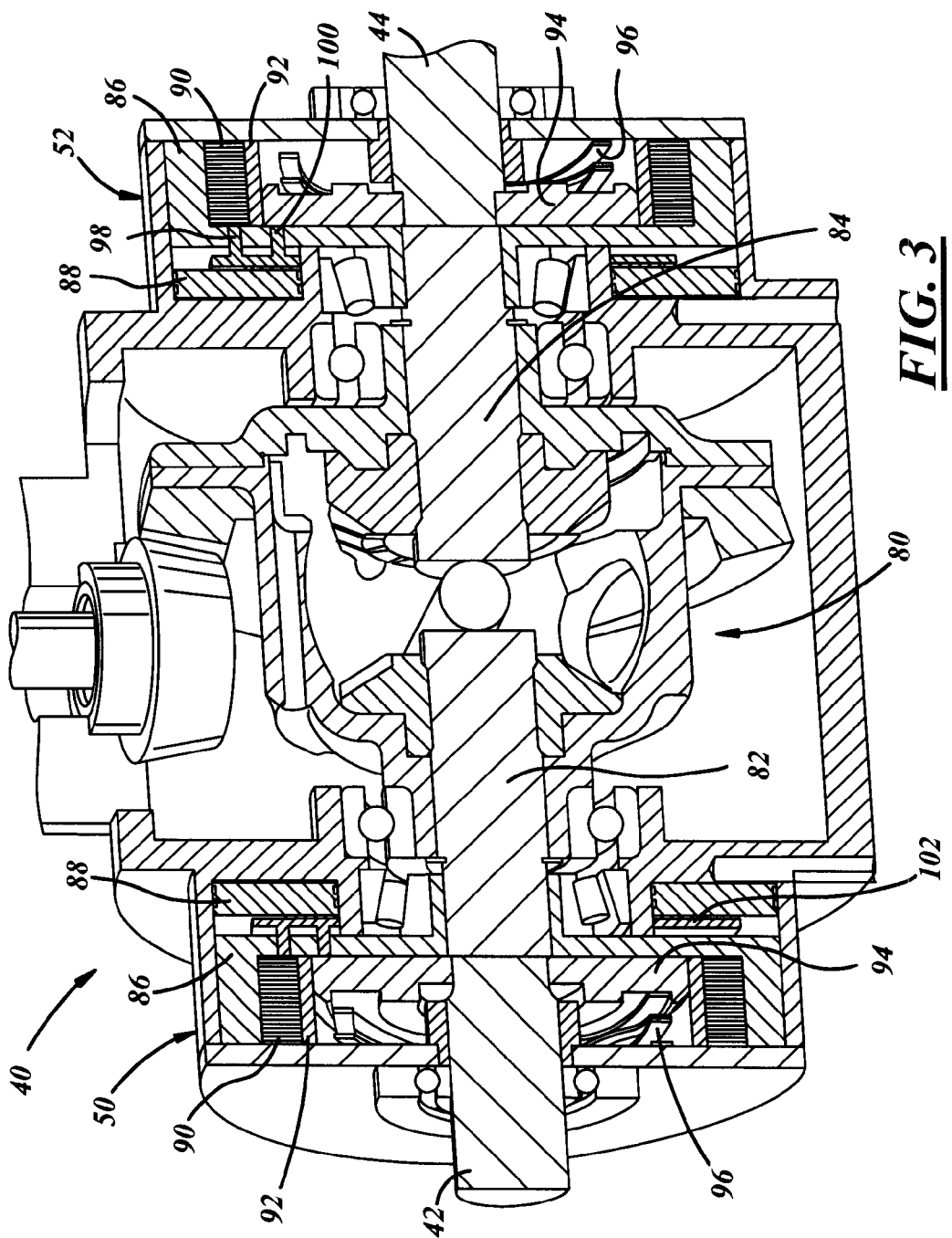
FIG. 3 is a cross-sectional view of a rear drive axle including wheel hub disconnects according to an embodiment of the present invention.

The auxiliary drive system may include at least one wheel disconnect device (e.g., wheel hub disconnect) 50, 52 for selectively connecting and disconnecting at least one auxiliary drive wheel 46, 48. Wheel hub disconnect 50, 52 may comprise wheel hub disconnects that are conventional and well-known to those of ordinary skill in the art. Referring to FIG. 1, the wheel hub disconnects 50, 52 may be separate from the differential housing and positioned close to each wheel 46, 48, or even somewhere in between the differential housing and wheel. In another embodiment, wheel hub disconnects 50, 52 may be integrated into and rotatably supported by the differential housing. Referring now to FIG. 3, rear axle 40 may include a differential 80 that facilitates differential rotation between a pair of differential output shafts 82, 84, as is well known in the art. Differential output shafts 82, 84 may be fixed to rotate with a clutch housing member 86 of each wheel hub disconnect 50, 52.

An axially moveable piston 88 may be disposed within a cavity between clutch housing member 86 and the differential housing. The piston cavity may communicate with a source of hydraulic fluid pressure (not shown), which selectively provides fluid pressure to the piston cavity to axially move piston 88. It will be appreciated that the source of hydraulic pressure is not limited to any particular hydraulic fluid pressure generating device, and may include, without limitation, a pump, valves, accumulator, and electronic control unit, or any combination thereof.

Referring still to the embodiment illustrated in FIG. 3, each wheel hub disconnect 50, 52 may also include a clutch pack 90 having a plurality of outer disks, which are in splined engagement with a set of internal splines defined by the clutch housing member 86. In addition, the clutch pack 90 may include a plurality of inner disks, which are interleaved with the outer disks in a well known manner. The inner disks may be in splined engagement with a coupling member 92. The coupling member 92 may define a set of internal splines, which are in splined engagement with an axially moveable collar 94 having on its radially inner face one or more dog clutch features. These dog clutch features may be selectively engageable with corresponding dog clutch features on the rear half shafts 42, 44 such that the coupling member 92 may be selectively fixed to rotate with the rear half shafts 42, 44 when the dog clutch features of the axially moveable collar 94 and the rear half shafts 42, 44 are engaged. A resilient biasing member 96, such as a compression spring, may apply a force against collar 94 in a direction away from engagement of the dog clutch features.

Extending through clutch housing member 86 may be first and second axially moveable pins 98, 100. The first and second axially moveable pins may be engageable on one end with the clutch pack 90 and collar 94, respectively, and on the other end with an annular plate-like member 102. Annular member 102 may be separated from piston 88 by one or more bearing members, which may allow annular member 102 to rotate relative to piston 88. The first axially movable pin 98 may be shorter in length than the second pin 100. As piston 88 moves axially in the piston cavity due to an increase in fluid pressure therein, for example, annual member 102 may also be forced to move axially, which in turn may force second pin 100 to push collar 94 into locking engagement with rear half shafts 42, 44. Upon further movement of piston 88, member 102 may engage first pin 98 to compress clutch pack 90 and allow the transfer of torque between the differential shafts 82, 84 and rear half shafts 42, 44, respectively, the level of torque being dictated by the variable force applied to the clutch pack 90.

Figure 4:
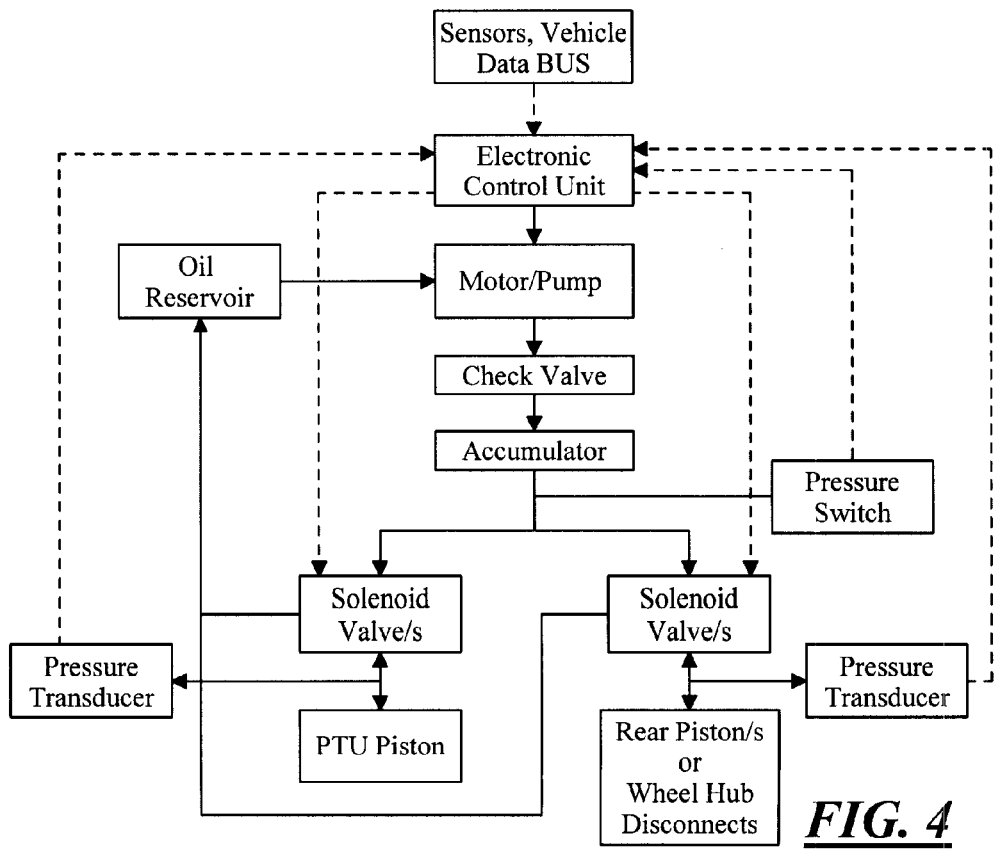
FIG. 4 is a schematic illustration of a control system arrangement for controlling an AWD vehicle driveline system according to an embodiment of the present invention.

Referring to FIG. 4, an exemplary control system arrangement is shown for controlling engagement of the clutch 34 and the rear clutch packs 90 contained in the wheel hub disconnects 50, 52. The power transfer unit 20, along with the use of conventional dog clutch wheel and hub disconnects 50, 52 may be provided to allow for the idling (e.g., complete idling) of the secondary or auxiliary drive system of a motor vehicle. When it is desirable to shift the mode of operation of the vehicle from 4×4 to 4×2, the following process may occur to place the auxiliary drive system (i.e., drive shaft 38, idleable clutch 65, rear drive axle 40, and rear half shafts 42, 44) in an idle mode. First, the torque traveling through the multi-plate clutch 34 of the power transfer unit 20 may be reduced to a minimum value by reducing the hydraulic control pressure to a predetermined level. The wheel hub disconnects 50, 52 may then be placed in an open condition by reducing the hydraulic control pressure applied to the wheel hub disconnects 50, 52 which may reduce the torque transfer through the wheels to the half shafts 42, 44, thereby allowing wheel hub disconnects 50, 52 to open and disconnecting the rear drive wheels 46, 48 from the rear half shafts 42, 44. The hydraulic control pressure of the power transfer unit 20 may be further reduced, which may disconnect the collar 66 from the hollow driving input shaft 32 that is being driven by the front differential case 16. The preceding operation may remove virtually all of the drive forces from the auxiliary drive system, placing it in an idle condition. Referring now to the embodiment shown in FIG. 3, wheel hub disconnects 50, 52 may be placed in an open condition by reducing the hydraulic control pressure applied to pistons 88 to a predetermined level, which may reduce the torque transfer through clutch pack 90 and then allow the collar 94 to be disconnected from the rear half shafts 42, 44, thereby disconnecting the rear drive wheels 46, 48 from the rear half shafts 42, 44.

Still referring to FIG. 4, in accordance with the schematic illustration of a control system arrangement for controlling an AWD vehicle driveline system, an ECU may energize a motor/pump to keep an accumulator (e.g., part of the hydraulic system of a motor vehicle which absorbs fluctuating fluid delivery, stores fluid at pressure, and can provide a rapid flow of fluid under pressure) charged (e.g., from an oil reservoir) to a predetermined pressure range as monitored by a pressure switch. A check valve may be located between the motor/pump and the accumulator to prevent backflow from the accumulator to the motor/pump when the motor/pump is de-energized. The ECU may also receive information from both hard wired vehicle sensors and/or a vehicle data BUS. This information may include, but is not limited to, a supervisory control signal, wheel speeds, lateral acceleration, longitudinal acceleration, yaw rate, throttle position, brake pedal switch, parking brake, and information from other ECUs within the vehicle. This information may be processed and used to determine the energization of the solenoid valve/s which provide the hydraulic power (i.e., pressure) to move the pistons for both the power transfer unit 20 (i.e., pistons 60) and rear pistons 88 or wheel hub disconnects 50, 52. These solenoid valve/s may direct the pressurized hydraulic fluid either "into" or "out of" the pistons 60, 88. When directing the pressurized fluid out of the pistons 60, 88, the fluid may be directed to a low pressure oil reservoir. Pressure transducers may be utilized for precise pressure feedback information to the ECU for more accurate control of the pressure within the pistons 60, 88. The pressure within the pistons 60, 88 may be controlled variably from a minimum to a maximum value. The pressure control may not be limited to a simple binary control.

When it is desirable to shift the mode of operation of the vehicle from 4×2 to 4×4, the following process occurs, which places the auxiliary drive system back into a driving mode of operation. First, hydraulic control pressure may be increased in the power transfer unit 20, urging the disconnect collar 66 into engagement with the hollow shaft 32 and connecting the shaft 32 to the input spline member 64 of the multi-plate clutch 34. When this occurs, only the collar 66, the input spline member 64, and the clutch inner discs are caused to rotate at the same speed as the front driving differential case 16. The control pressure within the power transfer unit 20 may be further increased, causing torque to begin to be transferred through the multi-plate wet clutch 34 in a controlled manner which may result in an increase in the rotational speed of the auxiliary drive system until its speed matches that of the front drive differential 18. The wheel hub disconnects 50, 52 may then be engaged. Once engaged, torque may now be transferred through the auxiliary drive system and controlled by the multi-plate wet clutch 34 of the power transfer unit 20 via hydraulic pressure control.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. A vehicle driveline, comprising:
a primary drive system including at least one primary drive wheel;
an auxiliary drive system including at least one auxiliary drive wheel; and
a system for idling the auxiliary drive system including at least one wheel disconnect device for selectively connecting and disconnecting the at least one auxiliary drive wheel from the auxiliary drive system and a power transfer unit for selectively engaging and disengaging the auxiliary drive system from the primary drive system,
wherein the power transfer unit includes a multi-plate clutch in series with a first dog clutch.

2. The vehicle driveline according to claim 1, wherein the primary drive system includes a front driving differential and at least one front half shaft for distributing torque to said at least one primary drive wheel.

3. The vehicle driveline of claim 2, wherein the multi-plate clutch is connected to the front driving differential via a hollow shaft.

4. The vehicle driveline of claim 3, wherein the multi-plate clutch is configured to limit the torque transferred through a right angle gear set.

5. The vehicle driveline of claim 4, wherein the auxiliary drive system includes a rear drive axle and at least one rear half shaft for distributing torque to the at least one auxiliary drive wheel.

6. The vehicle driveline of claim 5, wherein torque transferred through the right angle gear set may drive a drive shaft that drives the rear drive axle.

7. The vehicle driveline of claim 3, wherein said power transfer unit further includes a unit housing and a clutch housing, the unit housing and clutch housing defining a cavity therebetween.

8. The vehicle driveline of claim 7, wherein the cavity includes a piston and is in communication with a source of hydraulic fluid pressure configured to move the piston when the hydraulic fluid pressure is increased.

9. The vehicle driveline of claim 8, wherein the multi-plate clutch includes a plurality of outer disks and a plurality of inner disks, the plurality of outer disks in splined engagement with a plurality of internal splines defined by the clutch housing.

10. The vehicle driveline of claim 9, wherein the plurality of inner disks are in engagement with a coupling member.

11. The vehicle driveline of claim 10, wherein the coupling member may include a set of internal splines in engagement with the first dog clutch.

12. The vehicle driveline of claim 11, wherein the first dog clutch comprises an axially moveable collar having at least one dog clutch feature.

13. The vehicle driveline of claim 12, wherein the at least one dog clutch feature of the axially moveable collar is selectively engageable with the hollow shaft, such that the coupling member is selectively fixed to rotate with the hollow shaft.

14. The vehicle driveline of claim 13, wherein the hollow shaft includes at least one dog clutch feature for corresponding with the at least one dog clutch feature of the axially moveable collar.

15. The vehicle driveline of claim 13, further comprising a biasing member for applying a force against the axially movable collar in a direction away from engagement of the axially movable collar with the hollow shaft.

16. The vehicle driveline of claim 13, further comprising first and second axially moveable pins extending through the clutch housing, each of the first and second axially moveable pins having a first end engageable with the axially moveable collar and a second end engageable with an annular member.

17. The vehicle driveline of claim 16, wherein the first axially moveable pin is shorter in length than the second axially moveable pin.

18. The vehicle driveline of claim 17, wherein the annular member is configured to move axially and force the second pin to push the axially moveable collar into engagement with the hollow shaft.

19. The vehicle driveline of claim 18, wherein the annular member is further configured to engage the first pin, compress the multi-plate clutch, and allow the transfer of variable torque from the hollow shaft to the clutch housing.

20. The vehicle driveline of claim 1, wherein the at least one wheel disconnect device includes a second dog clutch.

21. A method for idling an auxiliary drive system, comprising:
   providing an engine, a transmission, and a front driving differential case;
   providing a primary drive system including at least one front half-shaft and at least one primary drive wheel;
   providing an auxiliary drive system including a drive shaft, a rear drive axle, at least one rear half-shaft, and at least one auxiliary drive wheel;
   providing a power transfer unit including a multi-plate clutch;
   providing a shaft configured for connecting the front driving differential case to the multi-plate clutch;
   providing a collar removably connected to the shaft;
   reducing the torque transferred through the multi-plate clutch;
   providing wheel hub disconnects including a dog clutch;
   opening the wheel hub disconnects;
   disconnecting the at least one auxiliary drive wheel from the at least one rear half-shaft; and
   disconnecting the collar from the shaft.

22. A method for engaging an auxiliary drive system, comprising:
   providing an engine, a transmission, and a front driving differential case;
   providing a primary drive system including at least one front half-shaft and at least one primary drive wheel;
   providing an auxiliary drive system including a drive shaft, a rear drive axle, at least one rear half-shaft, and at least one auxiliary drive wheel;
   providing a power transfer unit including a multi-plate clutch;
   providing a shaft configured for connecting the front driving differential case to the multi-plate clutch;
   providing a collar disconnected from the shaft;
   connecting the collar to the shaft;
   connecting the shaft to the multi-plate clutch;
   increasing the torque transferred through the multi-plate clutch;
   providing wheel hub disconnects including a dog clutch;
   engaging the wheel hub disconnects; and
   transferring torque through the auxiliary drive system.

\* \* \* \* \*